United States Patent
Gutoski et al.

(10) Patent No.: US 10,103,886 B1
(45) Date of Patent: Oct. 16, 2018

(54) GENERATING SHARED SECRETS FOR LATTICE-BASED CRYPTOGRAPHIC PROTOCOLS

(71) Applicant: ISARA Corporation, Waterloo (CA)

(72) Inventors: Gustav Michael Gutoski, Waterloo (CA); Marinus Struik, Toronto (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/600,377

(22) Filed: May 19, 2017

Related U.S. Application Data (62) Division of application No. 15/273,941, filed on Sep. 23, 2016, now Pat. No. 9,698,986.

(51) Int. Cl.
 *H04L 9/30* (2006.01)
 *H04L 9/08* (2006.01)

(52) U.S. Cl.
 CPC .......... *H04L 9/3093* (2013.01); *H04L 9/0816* (2013.01); *H04L 9/3086* (2013.01)

(58) Field of Classification Search
 CPC .... H04L 9/3093; H04L 9/3086; H04L 9/0816
 See application file for complete search history.

(56) References Cited

U.S. PATENT DOCUMENTS

| | | | | |
|---|---|---|---|---|
| 7,249,254 B2 * | 7/2007 | Vanstone | ............... | H04L 9/3093 713/155 |
| 2008/0069344 A1 * | 3/2008 | Yao | ....................... | H04L 9/0844 380/44 |
| 2011/0016325 A1 * | 1/2011 | Futa | ...................... | H04L 9/3093 713/179 |
| 2012/0290830 A1 * | 11/2012 | Resch | .................. | H04L 9/3093 713/150 |
| 2013/0007453 A1 * | 1/2013 | Benantar | ............... | H04L 9/0844 713/169 |
| 2013/0170640 A1 | 7/2013 | Gentry | | |
| 2016/0156470 A1 * | 6/2016 | Rietman | ............... | H04L 9/0838 380/44 |

OTHER PUBLICATIONS

Hanrot et al., Algorithms for the Shortest and Closest Lattice Vector Problems, Feb. 1, 2013, Laboratoire LIP.*

(Continued)

*Primary Examiner* — Robert B Leung
*Assistant Examiner* — Thomas Ho
(74) *Attorney, Agent, or Firm* — Henry Patent Law Firm PLLC

(57) ABSTRACT

In a general aspect, shared secrets for lattice-based cryptographic protocols are generated. In some aspects, a public parameter (a) is obtained, where the public parameter is an array defined for a lattice-based cryptography system. A first secret value (s) and a second secret value (b) are obtained. The first secret value is a second array defined for the lattice-based cryptography system, and is generated based on sampling an error distribution. The second secret value is a third array defined for the lattice-based cryptography system, and is a product of the first and second arrays (b←as). A public key ($\hat{b}$) is then generated by applying a compression function to the second secret value (b), and the public key is sent to an entity. A shared secret ($\mu$) is then generated based on information received from the entity in response to the public key.

20 Claims, 3 Drawing Sheets

(56) References Cited

OTHER PUBLICATIONS

Becker et al., Solving Shortest and Closest Vector Problems: The Decomposition Approach, Jun. 3, 2014.*
Alkim, E. et al., "Post-quantum key exchange—a new hope," Cryptology ePrint Archive: Report 2015/1092, dated Mar. 29, 2016, 21 pages.
Alwen et al., "Learning with rounding, revisited," Cryptology ePrint Archive: Report 2013/098, dated Feb. 21, 2013, 27 pages.
Bogdanov et al., "On the Hardness of Learning with Rounding over Small Modulus," Cryptology ePrint Archive: Report 2015/769, dated Feb. 5, 2016, 12 pages.
Baneriee et al., "Pseudorandom Functions and Lattices," Cryptology ePrint Archive: Report 2011/401, dated Aug. 10, 2011, 26 pages.
Peikert, "A Decade of Lattice Cryptography," Cryptology ePrint Archive: Report 2015/1092, dated Feb. 17, 2016, 91 pages.
Bos et al, "Frodo: Take off the ring! Practical, Quantum-Secure Key Exchange from LWE," Cryptology ePrint Archive: Report 2016/659, dated Sep. 9, 2016, 27 pages.
Bos et al, "Frodo: Take off the ring! Practical, Quantum-Secure Key Exchange from LWE," Cryptology ePrint Archive: Report 2016/659, dated Jun. 27, 2016, 27 pages.

* cited by examiner

GENERATING SHARED SECRETS FOR LATTICE-BASED CRYPTOGRAPHIC PROTOCOLS

CROSS-REFERENCE TO RELATED APPLICATIONS

This application is a divisional of U.S. application Ser. No. 15/273,941, filed on Sep. 23, 2016 and entitled "Generating Shared Secrets for Lattice-Based Cryptographic Protocols," which is hereby incorporated by reference.

BACKGROUND

The following description relates to generating shared secrets for lattice-based cryptographic protocols.

Cryptography systems are used to communicate securely over public channels. For example, some cryptography systems provide confidentiality by encrypting messages, and some cryptography systems provide authenticity through digital signatures. Cryptography systems may encrypt messages based on public or private keys, which may be based on shared secrets.

DETAILED DESCRIPTION

In some aspects of the present disclosure, cryptographic parameters represented as ring elements in a cryptographic protocol are compressed. For example, a public key or another public parameter in a key agreement protocol can be compressed, and the compressed parameter can be sent to another entity in the key agreement protocol. Exchanging compressed parameters in a cryptographic protocol can improve the efficiency of the protocol, for example by reducing the amount of channel bandwidth, pseudorandom data, or other resources consumed. Because key agreement protocols may be executed many millions or billions of times a day across the world to establish secure communications channels over computer networks, a reduction in the amount of bandwidth used by these key agreement protocols may yield a significant savings in computational and communication resources.

An example key agreement protocol referred to as "New Hope" has been proposed as a quantum-resistant replacement for contemporary key agreement protocols (e.g., to replace Diffie-Hellman (DH) and elliptic curve Diffie-Hellman (ECDH) key agreement protocols). According to a recent version of the "New Hope" proposal, parties exchange conventional ring-learning-with-errors (RLWE) samples, from which a shared secret is derived (see "Post-quantum key exchange—a new hope," by Erdem Alkim, Leo Ducas, Thomas Pöppelmann, and Peter Schwabe, March 2016). The parties executing the New Hope protocol exchange two messages with RLWE data (i.e., the elements referred to as b and u in the proposal). Each of the 1024 coefficients of b and u in the New Hope proposal are represented by 14 bits, which can result in messages including approximately 1792 bytes of RLWE data.

In some implementations of the techniques described here, parameters exchanged during a key agreement protocol may be compressed and sent as a public key to another party. Accordingly, the size of the messages exchanged in a key agreement protocol may be significantly reduced. In some implementations, the parameters are ring elements of ring $R_q$, and compression of the parameters is performed by compressing the binary representations of the ring elements. The compression may be achieved by dropping a certain number of bits in each coefficient of the ring element, yielding a ring element of a different ring $R_p$ where $p=\lceil q/2^d \rceil$. Decompression of the ring elements may be achieved by padding the binary representation of each coefficient of the ring element with the same number bits that were dropped, yielding a ring element in the original ring $R_q$. The number of bits dropped during compression may be chosen to be any suitable number to achieve desired bandwidth savings or other advantages. Where 5 bits are dropped in each coefficient of the ring element during compression, for example, the messages exchanged include only 1152 bytes of RLWE data, resulting in a bandwidth savings in excess of 35% when compared with the New Hope protocol.

In some implementations, the key agreement protocol may be executed in a manner that reduces the amount of computational resources consumed, for example, when compared with the New Hope key agreement protocol. For instance, certain ring elements computed and used in the New Hope protocol (e.g., error elements e, e', and e") may not be computed or otherwise determined. For instance, rather than obtaining element e and using that element to generate element b as in the New Hope proposal, element b may be generated only using the public parameter a and a secret value s obtained by sampling a distribution. Aspects of the present disclosure may therefore, when compared with the New Hope protocol, require less pseudorandom data, which may yield a significant savings in computational resources in some instances.

More generally, the techniques described below can be used in some instances to reduce the use of data transmitted and computed during the generation of cryptographic parameters. For example, the techniques described below can be applied to the New Hope protocol to reduce the size of the public elements b and u, or to another type of cryptographic protocol that generates public RLWE elements during a key agreement session. As another example, the techniques described below can be applied to the New Hope protocol to reduce the amount of random data that needs to be computed. In some cases, the techniques described below can be adapted for lattice-based cryptographic protocols or other types of cryptographic protocols or processes.

Figure 1:
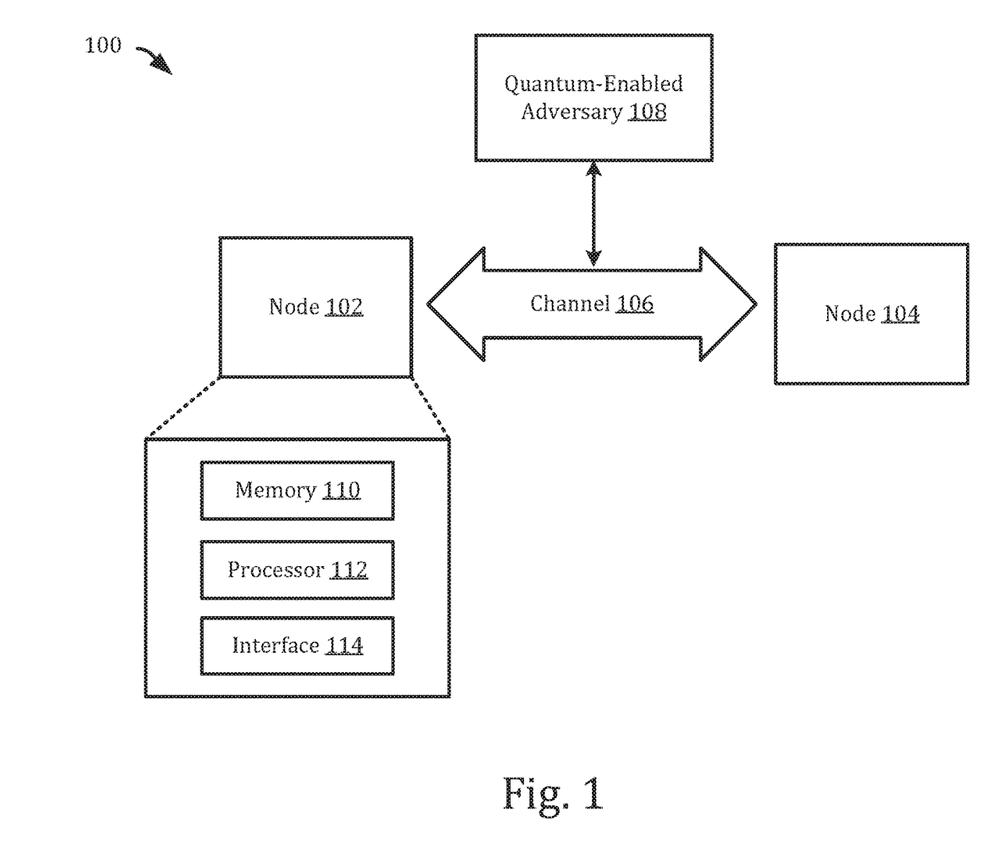
FIG. 1 is a block diagram showing aspects of an example communication system.

FIG. 1 is a block diagram showing aspects of an example communication system 100. The example communication system 100 shown in FIG. 1 includes two nodes 102, 104 that use a cryptographic scheme to communicate with each other over a channel 106. In the example shown, a quantum-enabled adversary 108 has access to information exchanged on the channel 106. A communication system may include additional or different features, and the components in a communication system may be configured to operate as shown or in another manner.

In some implementations, the nodes 102, 104 have a server-client relationship. For example, the node 102 can be a server and the node 104 can be its client in a served network, or vice-versa. In some implementations, the nodes 102, 104 have a peer-to-peer relationship. For example, the nodes 102, 104 can be peers in a peer-to-peer network. The nodes 102, 104 may have another type of relationship in the communication system 100.

The example nodes 102, 104 each have computational resources (e.g., hardware, software, firmware) that are used to communicate with other nodes. In some implementations, the nodes 102, 104 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 112 and an interface 114. Each of the nodes 102, 104 may include the same, additional or different components, and the nodes 102, 104 may be configured to operate as shown and described with respect to FIG. 1 or in another manner.

In the example node 102 shown in FIG. 1, the memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in any of FIGS. 2 and 3.

In the example node 102 shown in FIG. 1, the processor 112 can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in any of FIGS. 2 and 3.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes or devices. In some cases, the interface 114 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. In some examples, the channel 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptography systems are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptosystems that are believed to be invulnerable to quantum attack. For example, the "New Hope" protocol discussed above has been proposed as a quantum-resistant replacement for contemporary key agreement protocols such as the Diffie-Hellman (DH) and elliptic curve Diffie-Hellman (ECDH).

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner.

The example quantum-enabled adversary 108 shown in FIG. 1 can access information exchanged on the channel 106. For example, the quantum-enabled adversary 108 may access some or all of the information sent from the node 102 to the node 104 or to another recipient. In some instances, the quantum-enabled adversary 108 can directly observe correspondence between the nodes 102, 104; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms or perform other classically-hard computational tasks fast enough to compromise the security of certain cryptographic algorithms. For example, the quantum-enabled adversary 108 may be capable of computing prime factors fast enough to compromise certain RSA encryption standards or computing discrete logarithms fast enough to compromise certain ECC encryption standards.

In the example shown in FIG. 1, the nodes 102, 104 can use quantum-resistant cryptographic protocols that cannot be compromised by the example quantum-enabled adversary 108. For instance, the nodes 102, 104 may use a cryptographic protocol that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some implementations, the nodes 102, 104 use an encryption scheme that allows each node to send confidential messages to the other node, and the encryption scheme can be a quantum-resistant scheme that is not vulnerable to the quantum computing resources of the quantum-enabled adversary 108. Such digital signature schemes and encryption schemes can include or be used in conjunction with a key agreement protocol that is also secure against attacks by the quantum-enabled adversary 108. In some examples, the nodes 102, 104 can use the example techniques shown in any one or more of FIGS. 2-3, or the nodes 102, 104 may use variations of these and other techniques to communicate on the channel 106.

In some implementations, the nodes 102, 104 use a lattice-based cryptography scheme in their communications over the channel 106. The security of lattice-based cryptography schemes is based on the apparent hardness of certain problems on point lattices in rel. Some lattice-based cryptography schemes are believed to be secure against quantum-enabled adversaries. For example, it is believed that no efficient quantum algorithms are known for the hard problems typically used in lattice-based cryptography. Examples of lattice-based cryptography techniques include learning-with-errors-based (LWE) key agreement protocols, LWE encryption protocols, ring-learning-with-errors-based (Ring-LWE or RLWE) key agreement protocols, Ring-LWE encryption protocols, ring-learning-with-rounding-based (Ring-LWR or RLWR) key agreement protocols, Ring-LWR encryption protocols, NTRU algorithms (e.g., NTRUEncrypt, NTRUSign, etc.), Bimodal Lattice Signature Schemes (BLISS), PASS algorithms (e.g., PASSSign, etc.), TESLA (Tightly-secure, Efficient signature scheme from Standard LAttices) protocols, ring-TESLA protocols, and others.

Figure 2:
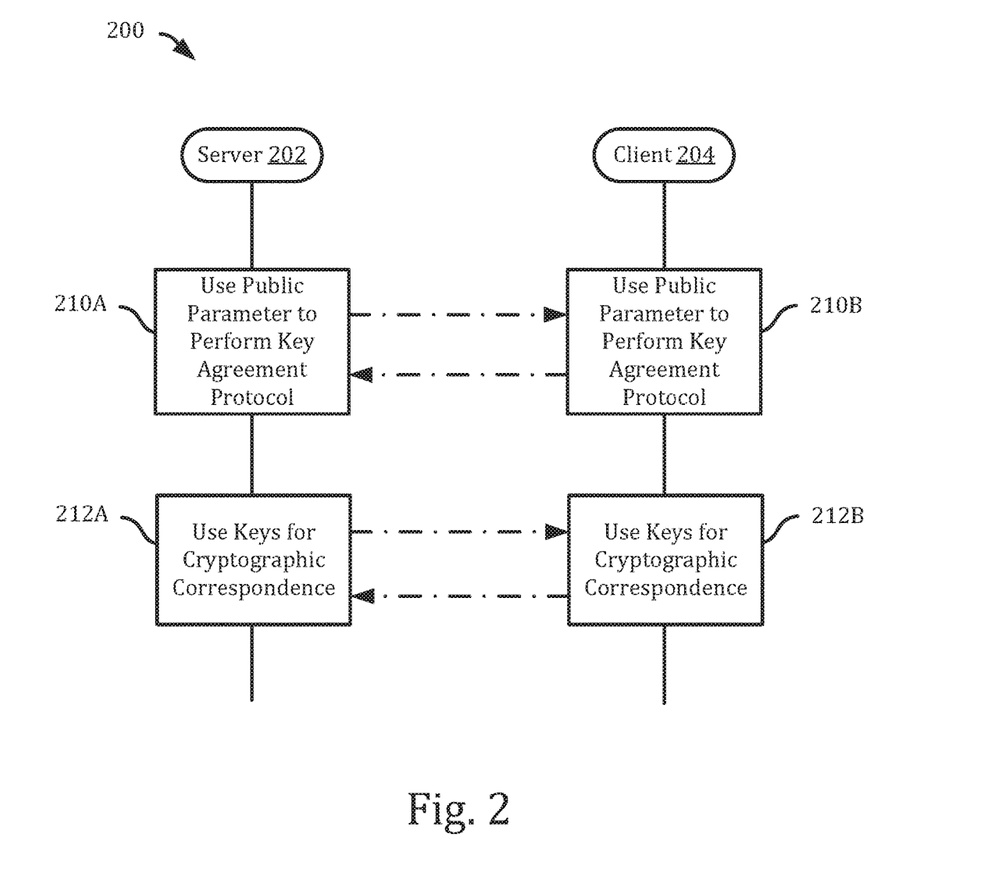
FIG. 2 is a flow diagram showing aspects of an example cryptography process.

FIG. 2 is a flow diagram showing aspects of an example cryptographic process 200. The example cryptographic process 200 can be performed, for example, by computer systems that can exchange information over a communication channel. For instance, operations in the cryptographic process 200 may be performed by the nodes 102, 104 in the example communication system 100 shown in FIG. 1 or in another type of system. The example process 200 may include additional or different operations, including operations performed by additional or different entities, and the operations may be performed in the order shown or in another order.

In some cases, one or more of the operations shown in FIG. 2 are implemented as processes that include multiple operations, sub-processes or other types of routines. For example, the process shown in FIG. 3 can be used, in some instances, to perform one or more of the example operations shown in FIG. 2. In some cases, operations can be combined, performed in parallel, iterated or otherwise repeated or performed in another manner.

The example cryptographic process 200 shown in FIG. 2 includes operations performed by a server 202 and a client 204. In the example shown, the server 202 and the client 204 represent two distinct entities in a cryptographic protocol. In the example shown, the server 202 initiates a key agreement protocol, and sends public data to the client 204; the client 204 uses the public data and the key agreement protocol to generate a shared secret or another cryptographic key with the server 202. The public data sent from server 202 to client 204 may be compressed in some instances. Similarly, the public data sent from client 204 to server 202 may be compressed in some instances. In some cases, the server 202 and client 204 may have a server-client relationship, a peer-to-peer relationship or another type of relationship.

In some examples, the cryptographic process 200 is secure against quantum-enabled adversaries such as, for example, the quantum-enabled adversary 108 shown in FIG. 1. For instance, in some cases, the example cryptographic process 200 is secure against certain types of attacks or other processes that can be performed by a quantum-enabled adversary who has access to public information exchanged between the server 202 and the client 204. The example cryptographic process 200 may also provide security against classically-enabled adversaries who do not have access to quantum computers or other quantum resources.

At 210A and 210B, the server 202 and client 204 perform a key agreement protocol using a public parameter. For example, the public parameter may be generated and used in a key agreement protocol similar to process 300 described below with respect to FIG. 3. In some implementations, the key agreement protocol produces a public-private key pair or a shared secret that can subsequently be used for cryptographic correspondence. For instance, performing the key agreement protocol may provide a private key at the server 202 and a public key at the client 204, or a shared secret at the server 202 and client 204.

In some implementations, the server 202 may generate a ring element, compress the ring element, and send the compressed ring element as a public key to the client 204. The client 204 may then decompress the public key, and use the result of the decompression to generate a shared secret. In some implementations, the client 204 may also generate a ring element, compress the ring element, and send the compressed ring element to the server 202. The server 202 may decompress the compressed ring element sent by the client 204, and use the result of the decompression to generate the same shared secret as the client 204. The shared secret generated may be used as a key for cryptographic correspondence, or may be used to generate a key for cryptographic correspondence.

At 212A and 212B, the keys generated by the key agreement protocol (at 210A and 210B) are used for cryptographic correspondence. For example, the keys generated by the key agreement protocol may be used to encrypt or decrypt a message, to sign or verify a message or to generate other parameters that are used for cryptographic correspondence. The keys may be used in another manner.

In some implementations, at 212A and 212B, the keys generated by the key agreement protocol (at 210A and 210B) are used for cryptographic correspondence in a lattice-based cryptographic protocol. For example, a cryptographic key may be used for encryption, decryption, digital signing, verifying or other operations in a lattice-based cryptographic protocol. In some examples, a cryptographic key is configured for use in learning-with-errors-based (LWE) encryption protocols, ring-learning-with-errors-based (Ring-LWE) encryption protocols, ring-learning-with-rounding-based (Ring-LWR) encryption protocols, NTRU algorithms (e.g., NTRUEncrypt, NTRUSign, etc.), Bimodal Lattice Signature Schemes (BLISS), PASS algorithms (e.g., PASSSign, etc.), TESLA (Tightly-secure, Efficient signature scheme from Standard LAttices) or ring-TESLA protocols or another lattice-based cryptographic protocol.

Figure 3:
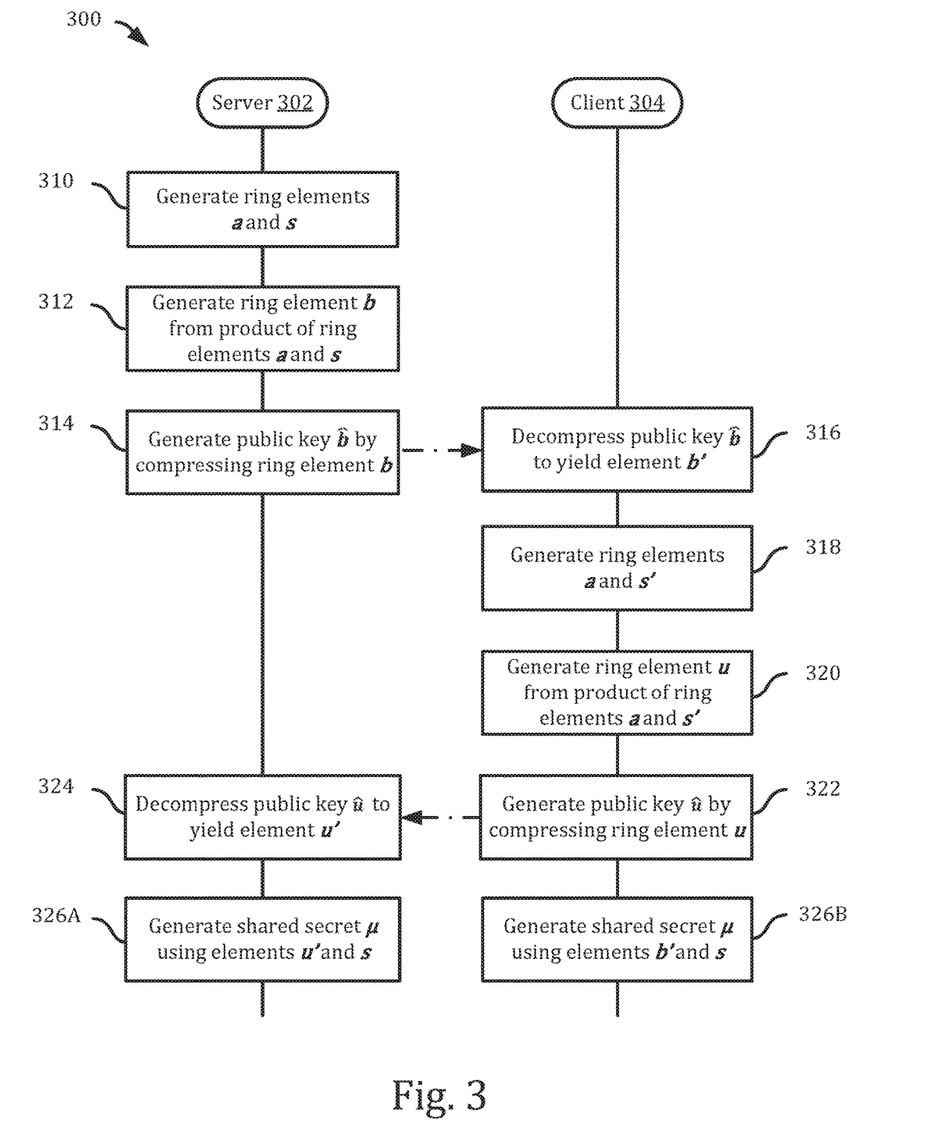
FIG. 3 is a flow diagram showing an example process for generating a shared secret for a lattice-based cryptographic protocol.

FIG. 3 is a flow diagram showing an example process 300 for generating a shared secret for a lattice-based cryptographic protocol. The example process 300 can be performed, for example, by computer systems that can exchange information over a communication channel. For instance, operations in the process 300 may be performed by the nodes 102, 104 in the example communication system 100 shown in FIG. 1 or in another type of system. The example process 300 may include additional or different operations, including operations performed by additional or different entities, and the operations may be performed in the order shown or in another order. In some cases, one or more of the operations shown in FIG. 3 are implemented as processes that include multiple operations, sub-processes or other types of routines. In addition, in some cases, operations can be combined, performed in parallel, iterated or otherwise repeated or performed in another manner or order.

The example process 300 shown in FIG. 3 includes operations performed by a server 302 and a client 304. In the example shown, the server 302 and the client 304 represent two distinct entities in a cryptographic protocol. In the example shown, the server 302 executes a key agreement protocol with the client 304 to generate a shared secret using compressed public data. In some cases, the server 302 and client 304 may have a server-client relationship, a peer-to-peer relationship or another type of relationship.

In some examples, the process 300 is secure against quantum-enabled adversaries such as, for example, the quantum-enabled adversary 108 shown in FIG. 1. For instance, in some cases, the example process 300 is secure against certain types of attacks or other processes that can be performed by a quantum-enabled adversary who has access to public information exchanged between the server 302 and the client 304. The example process 300 may also provide security against classically-enabled adversaries who do not have access to quantum computers or other quantum resources.

At 310, the server 302 generates a public parameter a and a secret value s. In the example shown, the public parameter a and the secret value s are each ring elements of a quotient ring defined for a lattice-based cryptography system. For example, the public parameter a may be ring elements of the quotient ring $R_q = \mathbb{Z}_q[x]/(x^n+1)$, where $\mathbb{Z}_q = \{0, \ldots, q-1\}$) or $$\mathbb{Z}_q = \left\{-\left\lfloor\frac{q-1}{2}\right\rfloor, \ldots, \left\lceil\frac{q-1}{2}\right\rceil\right\}.$$

A computation involving a representative $-1 \in S$, where $$S = \left\{-\left\lfloor\frac{q-1}{2}\right\rfloor, \ldots, \left\lceil\frac{q-1}{2}\right\rceil\right\},$$

may be converted modulo q to its equivalent representative $q-1 \in \{0, \ldots, q-1\}$. As a comparison, a representative $1 \in S$ is also represented by $1 \in \{0, \ldots, q-1\}$. The operator $\lfloor \cdot \rfloor$ above refers to a "floor function," wherein the result of the operation inside the $\lfloor \cdot \rfloor$ operator is rounded down to the nearest integer value (i.e., the largest integer value that is less than or equal to the result of the operations inside the $\lfloor \cdot \rfloor$ operator). The $\lceil \cdot \rceil$ operator above refers to a "ceiling function," wherein the result of the operation inside the operator is rounded up to the nearest integer value (i.e., the smallest integer value that is greater than or equal to the result of the operations inside the $\lceil \cdot \rceil$ operator). Another operator, $\lfloor \cdot \rceil$, refers to a "nearest integer function," wherein the result of the operation inside the operator is rounded to the nearest integer value, which may be greater than or less than (or equal to) the result of the operation inside the $\lfloor \cdot \rfloor$ operator. In the event where neither of the two closest integers are closer to the result of the operation inside the nearest integer function, a rounding rule (e.g., round down in the event of a tie) may be applied.

The quotient ring may thus be defined by values of n and q. The addition or multiplication of the public parameter a with other ring elements of a quotient ring (as discussed below) are performed as addition and multiplication operations, respectively, for $R_q$. Elements of $R_q$ may be n-dimensional arrays of integers modulo q in certain implementations, with n=1024 and q=12289<$2^n$.

The public parameter a may be generated by server 302 using a random seed value. The seed value can be, for example, a 256-bit (32-byte) seed for a pseudorandom number generator or another size or type of seed value. For example, server 302 may select a seed value that includes 256 randomly-selected bits, and may generate the public parameter a by applying a hash function to the seed value. The hash function may be any suitable hash function. In some implementations, the hash function is a secure hash algorithm of the primitive family Keccak, such as the SHA-2, SHAKE-128, or SHAKE-256 extendable-output functions. For example, in some implementations, the seed value and the public parameter a are generated, respectively, according to the equations:

$$seed \xleftarrow{\$} \{0, 1\}^{256}$$

$$a \leftarrow \text{Parse}(\text{SHAKE-128}(seed))$$

The public parameter a may also be generated using other suitable functions. For instance, in some implementations, the public parameter a may be generated using a pseudorandom function, such as a Salsa20 or ChaCha function. In some implementations, the public parameter a may be generated using a key generation function, such as an Advanced Encryption Standard (AES) key generation function.

The secret value s may be generated by sampling an error distribution (e.g., a Gaussian distribution) over a quotient ring defined for a lattice-based cryptography system. In some implementations, the secret value s is obtained by sampling a distribution of the quotient ring $R_q$ described above. For example, the secret value s may be sampled from the distribution $\psi_{16}^n$, which is a probability distribution over $R_q$ whereby each of the n coefficients are selected independently according to $\psi_{16}$ (which is a centered binomial distribution supported on the integer set $\{-16, \ldots, 16\}$). For example, in some implementations, the secret value s is sampled according to the equation:

$$s \xleftarrow{\$} \psi_{16}^n$$

In some cases, the secret value s can be obtained from another distribution or by another type of process.

In the example shown, the process 300 is performed without generating any error elements, avoiding the need to generate additional pseudorandom data and reducing the amount of computational resources needed to perform the process 300. For instance, a single sample from $\psi_{16}$ may consume 4 bytes of random data, so a full 1024-element sample from $\psi_{16}^n$ may consume 4 kilobytes of random data. By avoiding the sampling of error elements (e.g., error elements e, e', and e'' discussed below), the amount of random data consumed by the server 302 may be reduced by up to one half in some instances, and the amount of random data consumed by the client 304 may be reduced by two-thirds in some instances.

At 312, the server 302 generates a secret value b using the public parameter a and the secret value s. The secret value b may be a ring element of a quotient ring defined for a lattice-based cryptography system, such as the quotient ring $R_q$ described above. In the example shown, the secret value b is generated by computing a product of the public parameter a and the secret value s (i.e., b←as). Thus, in the example shown, secret value b is generated independent of an error element during the lattice-based cryptographic protocol, reducing the amount of pseudorandom data needed.

At 314, the server 302 generates a public key $\hat{b}$ by applying a compression function to the secret value b. The compression function may be applied element by element to each coefficient of the secret value b. The compression function may be any suitable function for producing an output that includes less bits than the input to the function. For example, an input to the compression function may include 1792 bytes, while the output of the compression function may include 1152 bytes. In some implementations, one or more bits of the input to the compression function may not be recoverable given only the output of the compression function (what is sometimes referred to as "lossy" compression). In some implementations, the public key is generated according to the following equation:

$$\hat{b} \leftarrow \text{compress}(b)$$

where compress(•) refers to the compression function.

In some implementations, the compression function drops a number d of the low-order bits in a binary representation of each coefficient of b. Where the secret value b is an element of the quotient ring $R_q$ described above, the public key $\hat{b}$ may be a ring element of a different quotient ring $R_p$ where $p = \lceil q/2^d \rceil$. Each coefficient of a given element of $R_q$ can be represented in binary using $\lceil \log_2 q \rceil$ bits, whereas each coefficient of a given element of $R_p$ can be represented in binary using only $\lceil \log_2 q \rceil - d$ bits.

Decompression may be achieved (e.g., by the client 304 as described below at 316) by padding the binary representation of each coefficient of $\hat{b}$ with the same number d of additional low-order bits (e.g., bits initialized to zero), yielding an element in the original ring $R_q$. In some implementations, an effect of the compression by the server 302 (combined with decompression at the client 304 at 316) is that each coefficient of b is rounded down to the nearest multiple of $2^d$. For example, where the number of d bits dropped during the compression is chosen to be d=5 bits, the messages exchanged by the server 302 and the client 304 during the key agreement protocol include only 1152 bytes of RLWE data, resulting in a bandwidth savings in excess of 35%.

In some implementations, a fixed number d may be predetermined, and the compression function is based on Equation (1) below:

$$\text{compress}: \mathbb{Z}_q \to \mathbb{Z}_p : x \mapsto \lfloor x/2^d \rfloor \qquad (1)$$

where x represents a binary representation of an integer (e.g., a coefficient of the secret value b). The compress(•) function of Equation (1) may be extended to ring elements, such as the secret value b, whereby $\text{compress}(r) \in R_p$ is obtained from $r \in R_q$ by applying compress(•) to each coefficient of r. Informally, the compress(•) function of Equation (1) drops the d low-order bits of each coefficient of an input array (e.g., a ring element). The corresponding decompress (•) function to Equation (1) may pad each coefficient of its input with an additional d low-order bits that are, for example, initialized to zero. An example decompression function corresponding to Equation (1) is shown in Equation (2) below:

$$\text{decompress}: \mathbb{Z}_p \to \mathbb{Z}_q : \hat{x} \mapsto \hat{x} \cdot 2^d \qquad (2)$$

where $\hat{x}$ represents a binary representation of an integer (e.g., a coefficient of the compressed secret value b (public key $\hat{b}$)).

The example compress(•) and decompress(•) functions of Equations (1) and (2) admit efficient implementations on a computer using standard bit shift operations. For example, the compress(•) and decompress(•) functions could be described in pseudo-code as follows:

$$\text{compress}: x \mapsto (x \ll d)$$

$$\text{decompress}: x \mapsto (x \gg d)$$

where the << and >> operators refer to bit-shift operators in source code, such as C-style bit-shift operators.

The decompression function may be chosen such that, for a given $r \in R_q$, the ring element r'=decompress(compress(r))$\in R_q$ is close enough to r so as not to induce an unacceptably high probability of failure in the surrounding protocol. While a naive decompression function may view each coefficient b as an element of $\mathbb{Z}_q$ instead of $\mathbb{Z}_p$, such a function would not produce a result that satisfies the condition above, i.e., the output of ecompress(compress(r)) would not be close enough to r to ensure a sufficiently low probability of failure. Examples of decompression functions that satisfy this are described below.

In some implementations, such as those utilizing Ring-LWE protocols, the compression function rounds each coefficient x of secret value b to a nearest multiple of a positive integer t. The positive integer t may be a power of two in certain implementations. An example compression function that rounds a coefficient x of secret value b to a nearest multiple of a positive integer t is shown below in Equation (3):

$$\text{compress}: \mathbb{Z}_q \to \mathbb{Z}_p : x \mapsto \lfloor \frac{x}{t} \rfloor$$

Although Equation (3) is shown with the $\lfloor \cdot \rfloor$ operator, Equation (3) may be modified to include the $\lceil \cdot \rceil$ operator or the $\lfloor \cdot \rceil$ operator instead. The value of the modulus of p may depend upon q, t, and the choice of operator $\lfloor \cdot \rfloor$, $\lceil \cdot \rceil$, or $\lfloor \cdot \rceil$ in Equation (3). In certain implementations, $p=\lceil q/t \rceil$ or $p=\lceil q/t \rceil+1$. An example decompression function corresponding to Equation (3) is shown in Equation (4) below:

$$\text{decompress}: \mathbb{Z}_p \to \mathbb{Z}_q : \hat{x} \mapsto \hat{x}t \qquad (4)$$

In some implementations, such as those that utilize Ring-LWR protocols, the compression function computes, for each coefficient x of the secret value b, a product of the coefficient x and an integer p divided by another integer q, rounds the product, and computes the rounded product modulo the integer p. An example compression function that includes these steps is shown below in Equation (5):

$$\text{compress}: \mathbb{Z}_q \to \mathbb{Z}_p : x \mapsto \lfloor (p/q)x \rceil \bmod p \qquad (5)$$

Although Equation (5) is shown with the $\lfloor \cdot \rceil$ operator, Equation (5) may be modified to include the $\lceil \cdot \rceil$ operator or the $\lfloor \cdot \rfloor$ operator. An example decompress function corresponding to Equation (5) is shown in Equation (6) below:

$$\text{decompress}: \mathbb{Z}_p \mathbb{Z}_q : \hat{x} \mapsto \lfloor (p/q) \hat{x} \hbar \qquad (6)$$

With any chosen compress(•) and decompress(•) function, the respective function may be applied to ring elements by applying the function to each coefficient of the ring elements.

After applying the compression function to the secret value b, the server 302 may then transmit the output of the compression function (i.e., the public key $\hat{b}$) to the client 304. In some implementations, the server 302 may also transmit additional information to the client 304 along with the public key $\hat{b}$. For example, in implementations where the server 302 generates the public parameter a using a seed value, the server 302 may transmit the seed value to the client 304 along with the public key $\hat{b}$.

At 316, the client 304 generates a public value b' by applying a decompression function to the public key $\hat{b}$. The decompression function may be applied element by element to each coefficient of the public key $\hat{b}$. The decompression function may be any suitable decompression function that corresponds to the compression function applied at 314. Where the compression function is "lossy" (e.g., bits are dropped from the coefficients of the ring element b when the compression function is applied) the decompression function may not be able to recover the original secret value b from the public key $\hat{b}$. In some implementations, the public value b' is generated according to the following equation:

$$b' \leftarrow \text{decompress}(\hat{b})$$

In the example shown, the public value b' is a ring element of a quotient ring defined for a lattice-based cryptography system, such as the quotient ring $R_q$ described above. In some implementations, the decompress function pads each coefficient of its input (i.e., $\hat{b}$) with additional d low-order bits. The bits with which the public key $\hat{b}$ is padded may be initialized to zero. As with the compress(•) function above, the decompress(•) function may be extended to ring elements so that decompress($\hat{r}$)$\in R_q$ is obtained from $r \in R_p$ simply by applying decompress(•) to each coefficient of $\hat{r}$. Thus, the decompression function used at 316 may be the equation described in Equation (2) above.

In some implementations, such as those where the compression function applied to the secret value b was defined by Equations (3) or (5), the decompression function applied to the public key $\hat{b}$ at 316 may be defined by Equations (4) or (6), respectively. That is, where the public key $\hat{b}$ is generated by rounding the secret value b to a nearest multiple of a positive integer t, the public value b' may be generated by multiplying the public key $\hat{b}$ by the positive integer t. Likewise, where the public key $\hat{b}$ is generated by computing a product of the secret value b and an integer p divided by another integer q, rounding the product, and computing the rounded product modulo the integer p, the public value b' may be generated by multiplying the public key $\hat{b}$ by the integer p divided by the integer q.

At 318, the client 304 generates the public parameter a and a secret value s'. In the example shown, the public parameter a and the secret value s' are each elements of a quotient ring defined for a lattice-based cryptography system, such as the quotient ring $R_q$ described above. The public parameter a may be generated by client 304 using a random seed value generated by server 302 and sent to client 304 along with the public key $\hat{b}$ at 314. The client 304 may generate the public parameter a by applying a hash function to the seed value received from the server 302. The hash function may be a secure hash algorithm of the primitive family Keccak, such as the SHAKE-128 or SHAKE-256 extendable-output functions. The public parameter may be generated using other suitable functions.

As with the secret value s, the secret values' may be generated by sampling an error distribution (e.g., a Gaussian distribution) over a quotient ring defined for a lattice-based cryptography system. In some implementations, the secret value s' is generated by sampling a distribution of the quotient ring $R_q$ described above. For example, as discussed in the New Hope proposal, the secret value (s') may be sampled from the distribution $\psi_{16}^n$, which is a probability distribution over $R_q$ whereby each of the n coefficients are selected independently according to $\psi_{16}$ (which is a centered binomial distribution supported on the integer set $\{-16, \ldots, 16\}$).

At 320, the client 304 generates a secret value u using the public parameter a and the secret value s'. In the example shown, the secret value u is a ring element of a quotient ring defined for a lattice-based cryptography system, such as the quotient ring $R_q$ described above. In the example shown, the secret value u is generated by computing a product of the public parameter a and the secret value s' (i.e., u←as'). Thus, in the example shown, secret value u is generated independent of an error element during the lattice-based cryptographic protocol, reducing the amount of pseudorandom data needed.

At 322, the client 304 generates a public key $\hat{u}$ by applying a compression function to the secret value u. The compression function may be the same function applied to the secret value b at 314. For example, the compression function may drop a number d of the low-order bits in each coefficient of u. Thus, where the secret value u is an element of the quotient ring $R_q$ described above, the public key $\hat{u}$ may be a ring element of a different quotient ring $R_p$, where $p=\lceil q/2^d \rceil$. The client 304 then sends the public key $\hat{u}$ to the server 302.

In some implementations, the client 304 also sends additional information to the server 302 along with the public key $\hat{u}$. For example, the client 304 may generate an additional secret value v by computing a product of the secret value b' and the secret value s' (i.e., v←b's'). The secret value v may therefore be a ring element of a quotient ring defined for a lattice-based cryptography system, such as the quotient ring $R_q$ described above. In addition, the secret value v may be generated independent of an error element during the lattice-based cryptographic protocol, reducing the amount of pseudorandom data needed.

The secret value v may then be used to generate an additional public value r that is transmitted to the server 302 along with the public key $\hat{u}$ at 320. As an example, the additional public value r may include recovery information generated by sampling an output of a recovery function with v as an input to the function. The recovery function may take as input an array (e.g., the secret value v) and generate as an output recovery information used in a reconciliation function (e.g., similar to the HelpRec( ) function described in the New Hope proposal). The recovery information may be used by server 302 to generate value u from v',r as described below, and ensure that the value u will be the same as the value u generated by the client 304 from v,r as described below. The recovery information may reveal no new information on the value u, so security may not be compromised by sending the recovery information as a part of public value r. In some implementations, the public value r is generated according to the equation below:

$$r \xleftarrow{\$} HelpRec(v)$$

where HelpRec( ) is the HelpRec( ) function described in the New Hope proposal.

At 324, the server 302 generates a secret value u' by applying a decompression function to the public key $\hat{u}$. In the example shown, the secret value u' is a ring element of a quotient ring defined for a lattice-based cryptography system, such as the quotient ring $R_q$ described above. The decompression function may be the same function used to decompress the public key $\hat{b}$ at 316. For example, the server 302 may generate the secret value u' by padding the public key $\hat{u}$ with a number d bits that are initialized to zero.

At 326A and 326B, the server 302 and the client 304 each generate a shared secret μ. In particular, the server 302 generates the shared secret μ using the secret values u and the s, while client 304 generates the same shared secret μ using the secret values b and s'. As an example, the server 302 may generate a secret value v' by computing the product of the secret value u and the secret values (i.e., v'←us). The secret value v' may thus be a ring element of a quotient ring defined for a lattice-based cryptography protocol, such as the quotient ring $R_q$ described above.

Using the secret value v', the server 302 may generate the shared secret μ. For example, using the secret value v' and the public value r sent by the client 304 at 322, the server 302 may generate value u. The value u may be generated by applying a reconciliation function to the secret value v' and the public value r. The reconciliation function may use the recovery information in public value r to ensure that the value u matches the value u generated by the client 304 as described below (e.g., similar to the Rec(v',r) function disclosed in the New Hope proposal). In some implementations, the value u is generated according to the equation below:

$$u \leftarrow Rec(v',r)$$

where Rec( ) is the Rec( ) function described in the New Hope proposal.

The shared secret μ may then be generated by the server 302 by applying a hash function to the value u. The hash function may be a secure hash algorithm, such as the SHA3-256 function. In some implementations, the shared secret μ is generated according to the equation below:

$$\mu \leftarrow SHA3\text{-}256(u)$$

The client 304 may generate the shared secret μ by generating the same value u using the secret value v and the public value r. For example, the client 304 may apply a reconciliation function to the secret value v and the public value r to yield the value u. The reconciliation function may use the recovery information in public value r to ensure that the value u matches the value u generated by the server 302 as described above (e.g., similar to the Rec(v',r) function disclosed in the New Hope proposal). In some implementations, the value u is generated according to the equation below:

$$u \leftarrow Rec(v,r)$$

where Rec( ) is the Rec( ) function described in the New Hope proposal.

The client 304 may then generate the shared secret μ by applying the same hash function to the value u as the server 302 (e.g., the SHA3-256 function as described above).

The server 302 and the client 304 may then use the shared secret μ for cryptographic correspondence. For example, the shared secret μ generated by the key agreement protocol may be used to encrypt or decrypt a message, to sign or verify a message or to generate other parameters that are used for cryptographic correspondence as described above with respect to 216A, 216B of FIG. 2. The shared secret μ may be used in another manner.

Although described above with regard to a Ring-LWE key agreement protocol, in some implementations, the teachings of the present disclosure may be used in a LWE key agreement protocol. For instance, the teachings may be applied to a LWE-based version of the New Hope protocol. Because the compress(•) and decompress(•) functions described above are mappings between $\mathbb{Z}_q$ and $\mathbb{Z}_p$, they are extended to rings $R_q$ and $R_p$ component-wise. In an LWE-based cryptosystem, however, the elements are vectors or matrices with entries in $\mathbb{Z}_q$. A LWE-based version of the New Hope protocol may thus call for the transmission of a vector or matrix with entries in $\mathbb{Z}_q$ (e.g., at 314 of process 300 of FIG. 3). Accordingly, an example application of the present disclosure would include applying the compress(•) and decompress(•) functions entry-wise to these vectors or matrices to yield similar bandwidth savings as those described herein.

In addition, although described above as not generating error elements, the in some implementations, one or more error elements may be generated during process 300.

For example, in some instances, an error element e may also obtained by server 302 at 310, and the secret value b may be generated by adding the error element e to the product of the public parameter a and the secret value (s) (i.e., b←as+e). The error element e may be obtained by sampling the same error distribution used for sampling the secret value s. The error element e may also be a ring element of a quotient ring defined for a lattice-based cryptography system. For example, the error element e may be an element of the quotient ring $R_q$ described above.

As another example, the client 304 may also generate an error element e'. The error element e' may be obtained by sampling the same error distribution used for sampling the secret value s' (which may be the same error distribution used in sampling secret value s at 310). The error element e' may accordingly also be a ring element of a quotient ring defined for a lattice-based cryptography system, such as the quotient ring $R_q$ described above. In implementations where a secret value e' is generated by the client 304, the secret value u may be generated by adding the secret value e' to the product of the public parameter a and the secret value s' (i.e., u←as'+e').

As another example, the client 304 may also generate an error element e". The error element e" may be obtained by sampling the same error distribution used for sampling the secret value s' (which may be the same error distribution used in sampling secret value s at 310). The error element e" may accordingly also be a ring element of a quotient ring defined for a lattice-based cryptography system, such as the quotient ring $R_q$ described above. In implementations where a secret value e" is generated by the client 304, the secret value v may be generated by adding the secret value e" to the product of the secret value b' and the secret value s' (i.e., v←b's'+e").

Any number of the error elements e, e', and e" may be generated and used as described herein. For example, the error elements e and e', but not error element e", may be generated and used in a key agreement protocol.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (loT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, shared secrets for lattice-based cryptographic protocols are generated.

In a first example, a lattice-based cryptography method includes obtaining a public parameter (a) that is a first array defined for a lattice-based cryptography system, and obtaining a first secret value (s) that is a second array defined for the lattice-based cryptography system. The second array is generated based on sampling an error distribution. A second secret value (b) is also obtained. The second secret value (b) is a third array defined for the lattice-based cryptography system, and is the product of the first array (a) and the second array (s) (e.g., b←as). A public key ($\hat{b}$) is then generated by applying a compression function to the second secret value (b) by operation of one or more processors. The public key ($\hat{b}$) is sent to an entity, and a shared secret (μ) is generated based on information received from the entity in response to the public key ($\hat{b}$).

Implementations of the first example may include one or more of the following features. The compression function applied to the second secret value (b) may remove one or more lowest-order bits from a binary representation of an element of the second secret value (b). The compression function applied to the second secret value (b) may round an element of the second secret value to a nearest multiple of a positive integer (t). The compression function applied to the second secret value (b) may compute a product of an element of the second secret value (b) and a first integer (p) divided by a second integer (a), round the product, and reduce the rounded product modulo the first integer (p).

Implementations of the first example may include one or more of the following features. The public key ($\hat{b}$) may be a first public key. A second public key ($\hat{u}$) may be received from the entity in response to the first public key ($\hat{b}$), and a fourth array defined for lattice-based cryptography system (u') may be generated by applying a decompression function to the second public key ($\hat{u}$). The shared secret (μ) may be based on the fourth array (u'). The decompression function applied to the second public key ($\hat{u}$) may pad a binary representation of an element of the second public key ($\hat{u}$). The decompression function applied to the second public key ($\vec{u}$) may multiply an element of the second public key ($\vec{u}$) by an integer (t). The decompression function applied to the second public key ($\vec{u}$) may compute a product of an element of the second public key ($\vec{u}$) and a first integer (a) divided by a second integer (p). The product of the element of the second public key ($\vec{u}$) and the first integer (a) divided by the second integer (p) may be rounded.

Implementations of the first example may include one or more of the following features. The public parameter (a) may be generated using a seed value. Sending the public key ($\hat{b}$) to the entity may include sending the public key ($\hat{b}$) and the seed value to the entity. The first array (a) may be a first ring element of a quotient ring defined for a lattice-based cryptography system, the second array (s) may be a second ring element of the quotient ring, and the third array (b) may be a third ring element of the quotient ring.

In a second example, a lattice-based cryptography method includes obtaining a public key ($\hat{b}$) from an entity. A first array (b') defined for a lattice-based cryptography system is then generated by applying a decompression function to the public key ($\hat{b}$). A first secret value (s') is then obtained. The first secret value (s') is a second array defined for a lattice-based cryptography system, and the second array is generated based on sampling an error distribution. A second secret value (v) is also obtained. The second secret value (v) is a third array defined for a lattice-based cryptography system, and the third array is a product of the first array (b') and the second array (s') (v←b's'). A shared secret (μ) is then generated based on the second secret value (v).

Implementations of the second example may include one or more of the following features. The decompression function applied to the public key ($\hat{b}$) may pad a binary representation of an element the public key ($\hat{b}$). The decompression function applied to the public key ($\hat{b}$) may multiply an element of the public key ($\hat{b}$) by an integer (t). The decompression function applied to the public key ($\hat{b}$) may compute a product of an element of the public key ($\hat{b}$) and a first integer (q) divided by a second integer (p).

Implementations of the second example may include one or more of the following features. The public key ($\hat{b}$) may be a first public key. A public parameter (a), which is a fourth array defined for a lattice-based cryptography system, may be obtained. A third secret value (u), which is a fifth array defined for a lattice-based cryptography system, may also be obtained. The third secret value (u) may be a product of the second array (s') and the fourth array (a). A second public key ($\hat{u}$) may be generated by applying a compression function to the third secret value (u), and the second public key ($\hat{u}$) may be sent to the entity. The first array (b') may be a first ring element of a quotient ring defined for a lattice-based cryptography system, the second array (s') may be a second ring element of the quotient ring, and the third array (v) may be a third ring element of the quotient ring.

In some implementations, a computing system includes a data processing apparatus and a computer-readable medium storing instructions that are operable when executed by the data processing apparatus to perform one or more operations of the first example or the second example or both. In some implementations, a computer-readable medium stores instructions that are operable when executed by a data processing apparatus to perform one or more operations of the first example or the second example or both.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A lattice-based cryptography method comprising:
    obtaining a public key from an entity;
    by operation of one or more processors, generating a first array defined for a lattice-based cryptography system by applying a decompression function to the public key;
    obtaining a first secret value, wherein the first secret value is a second array defined for the lattice-based cryptography system, and the second array is generated based on sampling an error distribution;
    obtaining a second secret value, wherein the second secret value is a third array defined for the lattice-based cryptography system, and the third array is a product of the first array and the second array;
    generating a cryptographic key based on the second secret value; and
    using the cryptographic key in an execution of a lattice-based cryptographic protocol, wherein the cryptographic key is used to secure communication against attack between nodes in a communication system and the execution of the lattice-based cryptographic protocol comprises at least one of:
        using the cryptographic key to encrypt a message being transmitted between nodes in the communication system;
        using the cryptographic key to decrypt a message transmitted between nodes in the communication system;
        using the cryptographic key to digitally sign a message being transmitted between nodes in the communication system; or
        using the cryptographic key to verify a message transmitted between nodes in the communication system.

2. The lattice-based cryptography method of claim 1, wherein applying the decompression function to the public key comprises padding a binary representation of an element of the public key.

3. The lattice-based cryptography method of claim 1, wherein applying the decompression function to the public key comprises multiplying an element of the public key by an integer.

4. The lattice-based cryptography method of claim 1, wherein applying the decompression function to the public key comprises computing a product of an element of the public key and a first integer divided by a second integer.

5. The lattice-based cryptography method of claim 1, wherein the public key is a first public key, and the method comprises:
    obtaining a public parameter, wherein the public parameter is a fourth array defined for the lattice-based cryptography system;
    obtaining a third secret value, wherein the third secret value is a fifth array defined for the lattice-based cryptography system, and the third secret value is a product of the second array and the fourth array;
    by operation of one or more processors, generating a second public key by applying a compression function to the third secret value; and
    sending the second public key to the entity.

6. The lattice-based cryptography method of claim 1, wherein the first array is a first ring element of a quotient ring defined for a lattice-based cryptography system, the second array is a second ring element of the quotient ring, and the third array is a third ring element of the quotient ring.

7. A computing system comprising:
    a data processing apparatus;
    a computer-readable medium storing instructions that are operable when executed by the data processing apparatus to perform operations comprising:
        obtaining a public key from an entity;
        generating a first array defined for a lattice-based cryptography system by applying a decompression function to the public key;
        obtaining a first secret value, wherein the first secret value is a second array defined for the lattice-based cryptography system, and the second array is generated based on sampling an error distribution;
        obtaining a second secret value, wherein the second secret value is a third array defined for the lattice-based cryptography system, and the third array is a product of the first array and the second array;
        generating a cryptographic key based on the second secret value; and
        using the cryptographic key in an execution of a lattice-based cryptographic protocol, wherein the cryptographic key is used to secure communication against attack between nodes in a communication system and the execution of the lattice-based cryptographic protocol comprises at least one of:
            using the cryptographic key to encrypt a message being transmitted between nodes in the communication system;
            using the cryptographic key to decrypt a message transmitted between nodes in the communication system;
            using the cryptographic key to digitally sign a message being transmitted between nodes in the communication system; or
            using the cryptographic key to verify a message transmitted between nodes in the communication system.

8. The computing system of claim 7, wherein the instructions operable to apply the decompression function to the public key comprise instructions operable to pad a binary representation of an element of the public key.

9. The computing system of claim 7, wherein the instructions operable to apply the decompression function to the public key comprise instructions operable to multiply an element of the public key by an integer.

10. The computing system of claim 7, wherein the instructions operable to apply the decompression function to the public key comprise instructions operable to compute a product of an element of the public key and a first integer divided by a second integer.

11. The computing system of claim 7, wherein the public key is a first public key, and the instructions are operable when executed by the data processing apparatus to perform operations comprising:

obtaining a public parameter, wherein the public parameter is a fourth array defined for the lattice-based cryptography system;

obtaining a third secret value, wherein the third secret value is a fifth array defined for the lattice-based cryptography system, and the fifth array is a product of the second array and the fourth array;

by operation of one or more processors, generating a second public key by applying a compression function to the third secret value; and sending the second public key to the entity.

12. The lattice-based cryptography method of claim 4, comprising rounding the product of the element of the public key and the first integer divided by the second integer.

13. The lattice-based cryptography method of claim 5, wherein applying the compression function to the third secret value comprises removing one or more lowest-order bits from a binary representation of an element of the third secret value.

14. The lattice-based cryptography method of claim 5, wherein applying the compression function to the third secret value comprises rounding an element of the third secret value to a nearest multiple of a positive integer.

15. The lattice-based cryptography method of claim 5, wherein applying the compression function to the third secret value comprises:

computing a product of an element of the third secret value and a first integer divided by a second integer;

rounding the product; and reducing the rounded product modulo the first integer.

16. The lattice-based cryptography method of claim 1, wherein the second secret value is obtained independent of an error element.

17. The computing system of claim 10, wherein the instructions are operable to round the product of the element of the public key and the first integer divided by the second integer.

18. The computing system of claim 11, wherein the instructions operable to apply the compression function to the third secret value comprise instructions operable to remove one or more lowest-order bits from a binary representation of an element of the third secret value.

19. The computing system of claim 11, wherein the instructions operable to apply the compression function to the third secret value comprise instructions operable to round an element of the third secret value to a nearest multiple of a positive integer.

20. The computing system of claim 11, wherein the instructions operable to apply the compression function to the third secret value comprise instructions operable to:

compute a product of an element of the third secret value and a first integer divided by a second integer;

round the product; and reduce the rounded product modulo the first integer.

* * * * *

UNITED STATES PATENT AND TRADEMARK OFFICE
CERTIFICATE OF CORRECTION

PATENT NO. : 10,103,886 B1
APPLICATION NO. : 15/600377
DATED : October 16, 2018
INVENTOR(S) : Gutoski et al.

It is certified that error appears in the above-identified patent and that said Letters Patent is hereby corrected as shown below:

In the Specification

Column 5, Line 55, delete "rel." and insert -- $\mathbb{R}^n$. -- therefor.

Column 9, Line 49, delete "key b" and insert -- key $\hat{b}$ -- therefor.

Column 10, Line 3, delete "key b" and insert -- key $\hat{b}$ -- therefor.

Column 10, Line 41, delete "$decompress: \mathbb{Z}_p \rightarrow \mathbb{Z}_q; \hat{x} \mapsto \hat{x} \, 2^d$," and insert -- $decompress: \mathbb{Z}_p \rightarrow \mathbb{Z}_q: \hat{x} \mapsto \hat{x} 2^d$ -- therefor.

Column 11, Line 32, delete "Hoperator," and insert -- operator, $\lfloor \cdot \rceil$ -- therefor.

Column 11, Lines 36-37, delete "$decompress: \mathbb{Z}_p \, \mathbb{Z}_q: \hat{x} \mapsto \lfloor (p/q)\hat{x} \rceil$," and insert -- $decompress: \mathbb{Z}_p \rightarrow \mathbb{Z}_q: \hat{x} \mapsto \lfloor (p/q)\hat{x} \rceil$ -- therefor.

Column 12, Line 38, delete "values" and insert -- value s' -- therefor.

Column 13, Line 55, delete "secret values" and insert -- secret value s- -- therefor.

Column 17, Line 47, delete "(a)," and insert -- (q), -- therefor.

Column 17, Line 60, delete "$(\vec{u})$" and insert -- (û) -- therefor.

Column 17, Line 61, delete "$(\vec{u})$" and insert -- (û) -- therefor.

Signed and Sealed this
Eleventh Day of December, 2018

Andrei Iancu
*Director of the United States Patent and Trademark Office*

CERTIFICATE OF CORRECTION (continued)
U.S. Pat. No. 10,103,886 B1

Column 17, Line 62, delete "$(\vec{u})$" and insert -- (û) -- therefor.

Column 17, Line 63, delete "$(\vec{u})$" and insert -- (û) -- therefor.

Column 17, Line 63, delete "(a)" and insert -- (q) -- therefor.

Column 17, Line 65, delete "$(\vec{u})$" and insert -- (û) -- therefor.

Column 17, Line 65, delete "(a)" and insert -- (q) -- therefor.